B. C. BRAINARD.
Weft-Fork.
No. 211,217. Patented Jan. 7, 1879.
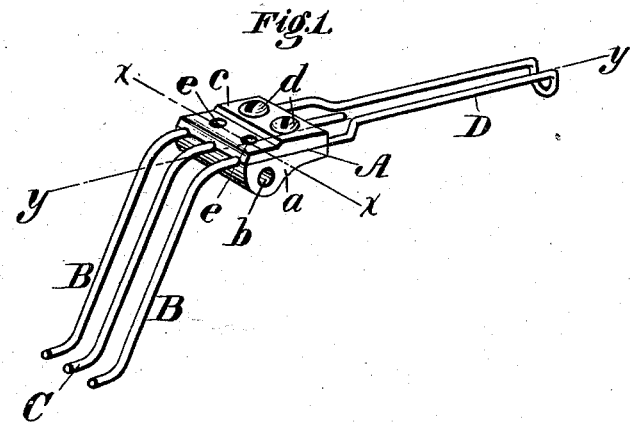
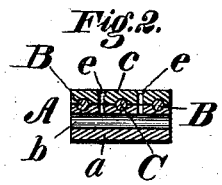
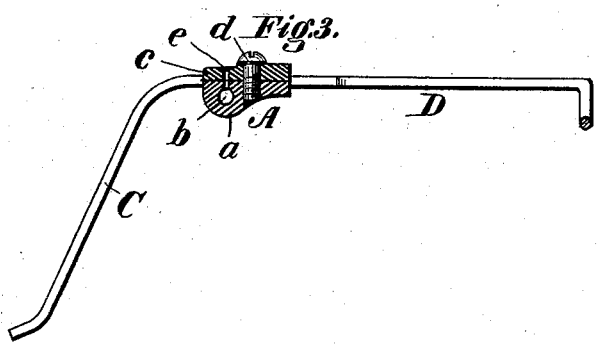
Witnesses:
Inventor:
B. C. Brainard.
By his Atty,
Dodge & Son

UNITED STATES PATENT OFFICE.

BENJAMIN C. BRAINARD, OF SOUTH HADLEY, MASSACHUSETTS.

IMPROVEMENT IN WEFT-FORKS.

Specification forming part of Letters Patent No. 211,217, dated January 7, 1879; application filed April 19, 1878.

*To all whom it may concern:*

Be it known that I, BENJAMIN C. BRAINARD, of South Hadley, in the county of Hampshire and State of Massachusetts, have invented certain Improvements in Weft-Forks, of which the following is a specification:

My invention relates to that class of devices known in the art as "weft-forks," employed in connection with the stop-motion mechanism of looms; and consists in constructing the device of two clamping-plates united by screws, and embracing separable wire tines or teeth between them, whereby the removal of a broken tine and its replacement are facilitated, and the assemblage of the parts permitted without heating the teeth or destroying their temper.

Referring to the accompanying drawings, Figure 1 represents a perspective view of my fork; Fig. 2, a cross-section on the line $x$ $x$, Fig. 1; Fig. 3, a longitudinal section on the line $y$ $y$, Fig. 1.

A represents the body or fulcrum plate of the fork, and B B C the three tines or fingers; D, the rear end or arm of the fork, the whole being made of the same general form, and intended to operate in the same manner as the forks now in general use.

The body A consists, as shown in the drawings, of a bottom plate, $a$, through which the pivot-hole $b$ is made, and of a top plate, $c$, secured to the bottom plate by means of screws $d$.

As shown in the drawings, the contiguous faces of the two plates are grooved to form round holes or seats to receive the tines or fingers, which latter are made of wire, and clamped at their upper ends firmly between the plates. In the fork represented in the drawings the two outside tines, B, and the arm D are formed of one continuous piece of wire, bent in a suitable manner, and passed at its ends between the two plates, while the central tooth, C, consists of a separate single piece of wire. By tightening the screws $d$ the plates $a$ $c$ are drawn firmly together, and caused to hold the tines rigidly in their proper positions. The outside teeth, B, may, however, be made in separate pieces, the arm D in such case being either formed as a continuation of one of the outside teeth or in a separate piece.

When the arm D is made separate from the teeth its ends will be clamped between the plates in the manner represented in the drawings, either in line with the outside teeth or in separate seats formed in the body-plates for the purpose.

The construction admits of the teeth, or either of them, being readily removed in case of breakage, and of a new one being readily inserted in its place.

By clamping the teeth between the plates I am permitted to make them of steel wire, or of firm and rigid wire, and to secure them in place without heating them, so that they retain their original strength and rigidity—a result which cannot be attained in those forks which have the teeth soldered in place.

For the purpose of permitting the lubrication of the bearing or pivot, one or more holes, $e$, will be formed in the body-plates, as represented in the drawings.

The teeth may be of any desired sectional form, whether cylindrical, rectangular, or otherwise.

I am aware that a fork has hitherto been made in which all the teeth or tines were made in one piece of hard rubber, and connected to a shank by means of a screw, and therefore I do not claim, broadly, a two-part fork.

Having thus described my invention, what I claim is—

1. The combination, in a weft-fork, of two body-plates, $a$ $c$, united by screws and separable metallic teeth B B C, clamped between said plates, and removable independently of each other.

2. A weft-fork consisting of wire arms D and wire teeth B C, clamped between and independently detachable from the two metallic plates $a$ $c$, as set forth.

3. The fork consisting of the two plates $a$ $c$ and their connecting-screws, the central tooth, C, and the teeth B and arm D, formed in one piece, as shown.

BENJAMIN C. BRAINARD.

Witnesses:
  H. G. SMITH,
  F. M. SMITH.